Nov. 30, 1971  O. BUSSE ET AL  3,623,424

PLATE FILTER PRESS

Filed June 30, 1969

INVENTORS

BY *Larson and Taylor*

ATTORNEYS

United States Patent Office 3,623,424
Patented Nov. 30, 1971

3,623,424
PLATE FILTER PRESS
Oswald Busse and Hugo Klesper, Michelbach, Germany, assignors to Passavant Werke, Michelbacher Hutte, Germany
Filed June 30, 1969, Ser. No. 837,633
Claims priority, application Germany, July 27, 1968, G 67 50 401
Int. Cl. B30b 1/00
U.S. Cl. 100—214
4 Claims

ABSTRACT OF THE DISCLOSURE

A plate filter press in which the filters are mounted on rods between end plates and the rods extend beyond one of the end plates to a yoke member to which the rods are connected. A pressurized cylinder unit acts between the yoke member and the end plate closest thereto, to urge the end plates toward each other to press the filters.

BACKGROUND OF THE INVENTION

This invention relates to filter presses, and in particular, it relates the new and improved plate filter press of the type having end plates between which the plate filters are mounted.

In filter presses provided heretofore, of the general type to which the present invention relates, there has been provided a frame having a horizontally arranged cross member carried at its ends by support poles, and on which cross member the end plates have been mounted for shiftable movement therealong with the filter plates supported therebetween. It is further known to include in this arrangement elongated support rods for supporting the filter plates between the end plates. Further, in the said previous arrangements, the force for urging the end plates together has been applied directly to the support rods thereby relieving the frame from such forces. Generally, the force has been applied by pressurized piston and cylinder units, associated with each support rod.

However, this arrangement has suffered from the disadvantage that considerable care must be taken in order to assure that a uniform force is applied at each support rod. For example, it is necessary to employ flow distributors or the ilke for equalizing the pressure at the cylinders. However, a flow distributor arrangement is complicated, expensive, and not sufficiently reliable in operation. However, such flow distributor arrangements are necessary in order to avoid irregular performance of each pressure cylinder which would result in cross movement of the filter plates and the end plates relative to each other, which movements would reduce the efficiency of the pressing operation.

Thus, there exists a need for a simplified, economical arrangement for applying pressure uniformly to urge the end plates together.

SUMMARY OF THE INVENTION

Thus, it is a purpose of the present invention to provide a new and improved plate filter press which overcomes disadvantages of filter presses known heretofore.

Briefly, this purpose is achieved by arranging a pressurized cylinder unit to act directly between one of the end plates and a yoke member to which the support rods are connected, thereby causing relative movement of the end plates towards each other. With this arrangement, the force is applied uniformly through the end plates and not to the individual support rods. Further, the forces are not applied directly against the frame structure of the filter press.

According to the present invention, the filter press includes support rods connected at one end to an end plate and extending between the end plates and connected at their other ends to a yoke member. Piston and cylinder means act between the yoke and the end plates to urge the end plates together. Further, contrary to previous arrangement using a single cylinder, in the present case, the force is applied directly between the end plates and the yoke, and not directly against the frame structure of the press. Thus, the frame structure need not be as strong and sturdy as would be the case if the entire pressing force were exerted thereagainst.

In one preferred arrangement of the present invention, the support rods are mounted at one of their ends to the yoke member and at the other of their ends to a fixed support plate. Mounted between the ends of the said support rods, would be the second end plate. With this arrangement the plate filters would be placed between the two end plates and the pressurized cylinder unit would be placed between the yoke member and the end plate closest thereto. In operation, the pressurized cylinder unit would urge the said second end plate away from the yoke member and towards the first end plate, thereby pressing the plate filters between the said end plates.

In accordance with another arrangement of the present invention, the end plate closest to the yoke is fixed relative to the frame, whereby the other end plate and the yoke member are movable as a unit. In this case, the pressurized cylinder unit would act between the fixed end plate and the yoke member thereby urging the yoke member away from the fixed end plate and hence, acting through the support rods to pull the movable end plate towards the fixed end plate thereby pressing the filter plates located between said end plates.

As noted above, the pressurized cylinder unit normally acts against at least one member which is fixed relative to the frame of the press. It is preferable to mount the pressurized cylinder unit on the frame at the said portion which is fixed relative thereto. This provides direct action without play which is useful for permitting a smooth removal of the filter cakes, such that the cakes are in alignment with filter cake bunkers located therebelow. Further, the opening and closing of the end plates will always be done at the same position relative to the frame.

Although any number of support rods may be provided, in a preferred arrangement, four support rods are provided. This provides a very uniform transmission of the applied force to the plate filters.

Thus, it is a purpose of this invention to provide a new and improved filter press of the type for pressing plate filters between end plates.

It is another object of this invention to provide a new and improved filter press of the type described wherein the force is applied to the plate filters uniformly with an apparatus which is economical and reliable.

It is another object of this invention to provide a filter press of the type described wherein a uniform force is applied to the plate filters while minimizing the force which must be absorbed by the frame structure of the press.

It is another object of this invention to provide a filter press of the type described wherein a pressurized cylinder unit acts directly between an end plate and a yoke member, whereby the end plates are moved, relative to each other along support rods for pressing the plate filters.

Other objects and the attendent advantages of the present invention will become apparent from the detailed description to follow.

BRIEF DESCRIPTION OF THE DRAWINGS

There follows a detailed description of preferred embodiments of the invention, to be read together with the accompanying drawings, which are provided only for purposes of illustration.

DETAILED DESCRIPTION OF THE PREFERRED EMBODIMENTS

Like numerals represent like elements in the two figures.

Figure 1:
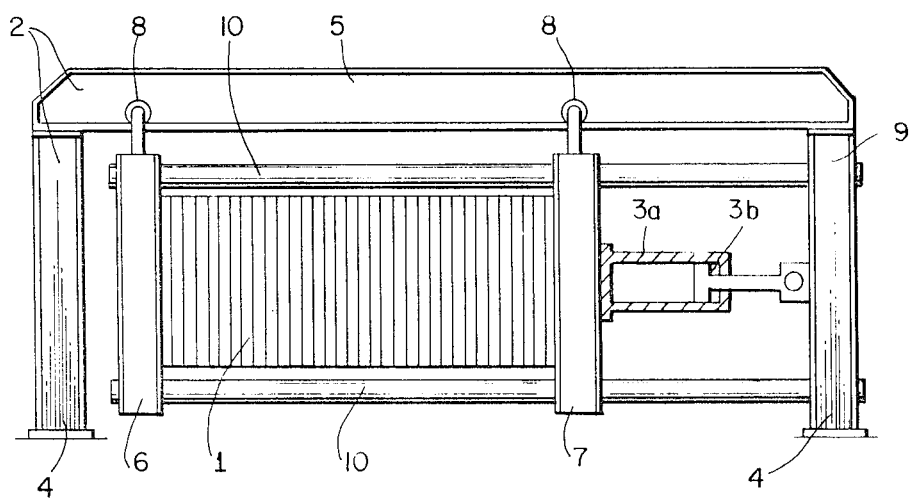
FIG. 1 is a side elevational view of a plate filter press constructed in accordance with the features of the present invention.

Referring to FIG. 1, the filter press includes a frame member 2, which comprises vertical support poles 4, and a horizontal cross member 5. Mounted on this cross member 5 are a pair of end plates 6 and 7. These end plates are mounted on the cross member 5 by means of suitable rollers 8. As will be explained in greater detail below, in the operation of the embodiment shown in FIG. 1, only the end plate 7 is intended to undergo movement longitudinally of the cross member 5. The roller on end plate 6 is provided primarily to provide an adjustment for the position of this end plate.

One support pole 4 also serves a yoke member 9 to which are rigidly connected one end of a plurality of support rods 10. These support rods extend through the end plate 7 and are connected to the end plate 6. A plurality of filter plates 1 are then mounted on the support rods 10 between the end plates 6 and 7.

A piston and cylinder unit, preferably a hydraulic unit, comprising a cylinder 3a and a piston 3b are provided between the end plate 7 and the yoke 9. By supplying pressure to the interior of the cylinder 3a, the end plate 7 is moved towards the end plate 6 thereby pressing plate filters located therebetween. Thus, by supplying pressurized fluid to the cylinder 3a there is provided a closed force circuit comprising cylinder 3a, end plate 7, plate filters 1, end plate 6, support rods 10, yoke member 9 and piston 3b.

Figure 2:
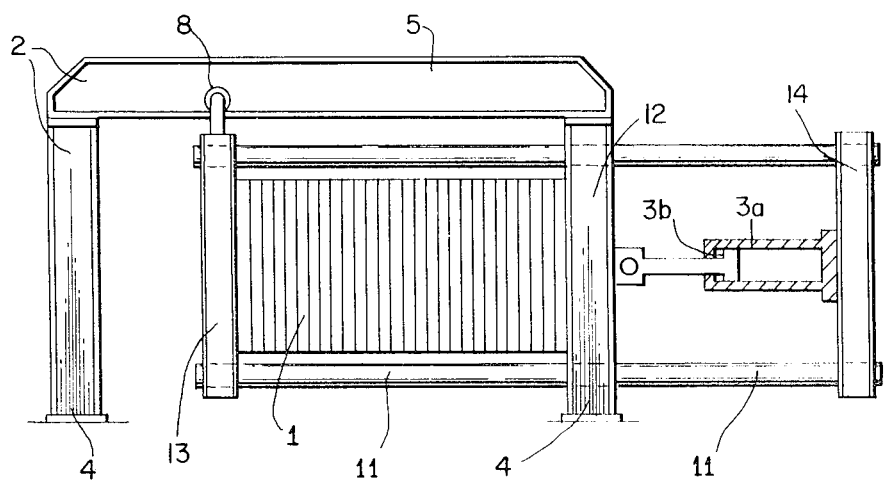
FIG. 2 is a side elevational view of another embodiment of a plate filter press constructed in accordance with the present invention.

FIG. 2 shows another embodiment of the invention. In this embodiment, one of the end plates, denoted by the numeral 12, is formed as a part of a support pole 12 while the yoke member 14 in this embodiment is movable relative to the frame. In this case, the other end plate 13 moves along the cross member 5, by means of roller 8, during the operation of the filter press. In this case, the support rods 11, like the support rods 10 of FIG. 1, are connected at one end to a yoke member, namely member 14, and at their other end to an end plate, namely movable end plate 13. Further, the piston and cylinder unit 3a and 3b is located between the fixed end plate 12 and the yoke member 14.

In the operation of the embodiment shown in FIG. 2, a closed power circuit is completed from cylinder 3a, through yoke member 14, support rods 11, end plate 13, plate filters 1, fixed end plate 12 and piston 3b.

It will be noted that in both embodiments, it is preferable to mount the cylinder 3a against the element which is not fixed relative to the frame. This provides a greater actuating surface against the movable member and provides a smoother operation.

Although the invention has been described in considerable detail with respect to preferred embodiments thereof, it will be apparent that the invention is capable of numerous modifications and variations apparent to those skilled in the art, without departing from the spirit and scope of the invention.

We claim:

1. A plate filter press comprising a fixed frame having mounted thereon a first end plate which is movable relative to the frame and a second end plate which is fixed relative to the frame, the first and second end plates thus being movable relative to each other such that the first end plate is movable toward and away from the second end plate, and a yoke member movable relative to the frame and positioned on the side of the said second end plate away from the first end plate, supporting rods mounted on said yoke member and at least one of said end plates and extending from the first end plate, beyond the second end plate to said yoke member, said support rods being fixed, at one of their ends, to said yoke member, said support rods adapted to support filter plates between said end plates, and a pressure cylinder means mounted to act against said yoke member and said second end plate for causing movement of the end plates relative to each other, whereby when the end plates are moved towards each other, the filter plates located between said end plates are compressed.

2. A plate filter press according to claim 1, wherein said pressurized cylinder means comprises at least one piston and cylinder unit positioned between said yoke member and said second end plate and arranged to act directly against the yoke member on the one hand and the second end plate on the other hand, such that when the yoke member moves away from the second end plate, the first end plate is pulled, by means of said support rods, towards said second end plate.

3. A plate filter press according to claim 2, wherein said cylinder is fixed to the yoke member and the piston is fixed to the second end plate.

4. A plate filter press according to claim 1, including at least four of said support rods.

References Cited

UNITED STATES PATENTS

| | | | |
|---|---|---|---|
| 816,624 | 4/1906 | Wagner | 210—228 |
| 1,977,480 | 10/1934 | Hiller et al. | 210—230 |
| 2,949,845 | 8/1960 | Kurita | 100—198 |

REUBEN FRIEDMAN, Primary Examiner

T. A. GRANGER, Assistant Examiner

U.S. Cl. X.R.

100—269; 210—224